Patented Nov. 21, 1939

2,180,728

UNITED STATES PATENT OFFICE 2,180,728

SEPARATION OF SULPHONATES

Frank W. Corkery, Crafton, Pa., assignor to Pennsylvania Industrial Chemical Corporation, a corporation of Pennsylvania No Drawing. Application March 16, 1937, Serial No. 131,182

4 Claims. (Cl. 260—503)

This invention relates to the separation from the still residue, hereinafter defined, of metallic sulphonates present in such still residue.

These sulphonates, separated from the other ingredients of the still residue, are a good base material for extreme pressure lubricants, and have other uses in the arts.

The still residue from which the sulphonates are separated is resultant from the treatment of light oil derived in the by-product coking of coal. Such light oil comes over in coal distillation, and is recovered from the gases with which it comes over by being absorbed in scrubbing oil which is ordinarily a heavy cut of petroleum.

The still residue with which I deal results from fractionation and purifying treatment of this light oil, following its removal from the scrubbing oil. This still residue contains polymers of resin-forming bodies in various stages of polymerization, some heavy monomers, traces of naphthalene, and various percentages of sulphates and sulphonates. It is a dark viscous oily substance deficient in drying qualities, and itself possessing little utility in the arts. As it is commercially available, the still residue may be obtained from either of the following operations conducted upon the light oil.

One such source of still residue is the still in which the light oil is purified and fractionated to give crude benzol, crude toluol, No. 1 crude solvent naphtha (crude xylol), and No. 2 crude solvent naphtha. The residuum from this fractionation consists largely of heat polymers, and is known in the trade as "crude still" residue.

The fractions from the crude still, after washing with sulphuric acid and neutralized, are distilled in what are known in the trade as "pure stills." The residues from the distillation of these fractions comprise primarily acid polymers and heat polymers, and comprise also sulphonates resultant from acid purification and alkaline neutralization of the light oil. The residues from the pure still contain also some compounds of the alkali and alkaline earths, including their sulphates resultant from neutralization following acid purification of the light oil. This pure still residue normally is mixed in a tank with the crude still residue, so that, as it is commercially available, still residue contains at least the residual products from these two types of still dealing with coke-oven light oil and its fractions. Usually there is also mixed in with these two still residues in the residue tank a third residue, which comprises bottoms from the distillation of the heavier cuts of No. 1 and No. 2 crude solvent naphtha. Usually the still residue is subjected to a distillation for the removal of solvents and naphthalene.

To recover sulphonates from such still residue, while purifying the still residue, I desirably pursue the following preferred method:

A low boiling aliphatic solvent, such as kerosene, V. M. P. naphtha, Stoddard solvent, ligroin, or gasoline, desirably a petroleum distillate of the gravity and boiling point known as "mineral spirits," is run into a treating tank and is agitated, as by means of a mechanical agitator. The still residue is then run into the tank, and is agitated with the petroleum distillate until a precipitate forms. Desirably, in this step the volume of petroleum distillate is approximately twice the volume of the still residue.

Before the precipitate has a chance to coagulate, water is run in, and is agitated with the body of liquid in the tank. This liquid itself contains in solution the aromatic hydrocarbon and resinous contents of the still residue, and the introduction of water by wetting the precipitate prevents its agglomeration. During this stage of the operation the mixture in the treating tank is at normal room temperature, at a slightly elevated temperature, or at a temperature somewhat below normal room temperature.

Either in the initial treating tank, or more efficiently after running it into a plurality of settling tanks, the treatment of the mixture is continued. If the mixture is transferred to a plurality of settling tanks, desirably the transfer is made with the introduction of live steam into the mixture, and with agitation; and steaming and agitation may be continued for a short period of time to insure completion of the sludge precipitation, and to prepare the mixture for stratification on settling. The dispersion of live steam through the mixture is desirable for the reason that it speeds up the rate of settling. If more time be allowed, the use of steam may be omitted.

Upon being allowed to settle stratification takes place in the mixture. The water content, the water initially added and that supplied by condensed steam if steam be used, floats the solution of still residue in petroleum distillate, to produce well defined stratification. In the water layer there is a settled mass of precipitate.

As the final stage of my preferred separation method, the petroleum distillate solution of still residue is decanted to leave water and sludge in the tank, or tanks. Purified still residue is recovered from solution in the petroleum solvent by distillation, as described in my co-pending application Serial No. 120,192, filed January 12, 1937. Any retained traces of solvent in the sludge are then steamed off, and the water is removed by blowing with warm air. The sludge which remains is a greasy substance, which is desirable as a base for extreme pressure lubricating compounds. While it apparently comprises a small content of sulphates and other substances, it is preponderantly composed of sulphonates of aromatic bodies native to the light oil by treatment of which the still residue is formed. I am unaware of the exact chemical composition of these sulphonates, but it is apparent that they comprise alkali or alkaline earth salts of sulphonates of the light oil aromatics.

Upon test I have found that this sulphonate sludge, as it is produced, possesses the fundamental qualities necessary in an extreme pressure lubricant. When tested in the Timken extreme pressure testing machine it does not show any sign of failure when the machine indicates a value of 100 on its scale, each unit of which is supposed to indicate a pressure of 1000 pounds. Upon moderate heating, under the effects of extreme pressure or otherwise, it shows very slight thinning tendency. At high temperatures the sulphonate sludge shows a tendency to harden, and this hardening presents an obstacle to its use as a single-substance extreme pressure lubricant base for some purposes.

Considering the sulphonate sludge as of itself, the remarkable fact concerning it is that it, normally considered, is a waste product (sludge) recovered from what has until recently been considered a waste product (still residue from the treatment of coal-derived light oil). As a waste product, recovered from a waste product, I yet have discovered that it possesses strikingly valuable potentialities.

While it has been stated above that I am unaware of the exact composition of the sulphonate sludge, which together with dipolymer oil forms my extreme pressure base, it has certain readily observable physical characteristics additional to those given above. Thus it has no resinous properties; it possesses only slight thermoplasticity; and is not tacky. It does not tend to separate, and has no definite melting-point. As recovered from the still residue, of which it forms approximately 14% of the initial content, by the method above described, it is soft and can be readily pumped and handled.

As a division of this application there has been filed application Serial No. 205,302, filed April 30, 1938.

I claim as my invention:

1. The herein described method of recovering sulphonate sludge from still residue resultant from the treatment and distillation of light oil derived from the by-product coking of coal and containing water-insoluble sulphonates formed by acid purification and alkaline neutralization in the light oil prior to distillation, which consists in precipitating sulphonates from the still residue by agitating the still residue with low boiling aliphatic hydrocarbon, wetting the precipitate by agitating the mixture with water before the precipitated sulphonates coagulate, effecting stratification of the mixture and settling of the precipitate expedited by injection of live steam into the mixture to form a water layer containing the sulphonates and a hydrocarbon layer containing the other still residue ingredients in solution, separating the layer of still residue solution and the sulphonate-containing water layer, and by drying recovering the sulphonates as a residual sludge.

2. The herein described method of recovering sulphonate sludge from still residue resultant from the treatment and distillation of light oil derived from the by-product coking of coal and containing water-insoluble sulphonates formed by acid purification and alkaline neutralization in the light oil prior to distillation, which consists in pursuing in sequence the steps of precipitating sulphonates from the still residue by mixing low boiling aliphatic hydrocarbon with the still residue, wetting the precipitate by agitating the mixture with water before the precipitated sulphonates coagulate, effecting stratification of the mixture and settling of the precipitate to form a water layer containing the sulphones and a hydrocarbon layer containing the other still residue ingredients in solution, separating the layer of still residue solution and the sulphonate-containing water layer, and by drying recovering the sulphonates as a residual sludge.

3. The herein described method of recovering sulphonate sludge from still residue resultant from the treatment and distillation of light oil derived from the by-product coking of coal and containing water-insoluble sulphonates formed by acid purification and alkaline neutralization in the light oil prior to distillation, which consists in pursuing in sequence the steps of precipitating sulphonates from the still residue by mixing low boiling aliphatic hydrocarbon with the still residue, wetting the precipitate by agitating the mixture with water before the precipitated sulphonates coagulate, effecting stratification of the mixture, and settling of the precipitate expedited by injection of live steam into the mixture to form a water layer containing the sulphonates and a hydrocarbon layer containing the other still residue ingredients in solution, separating the layer of still residue solution and the sulphonate-containing water layer, and by drying recovering the sulphonates as a residual sludge.

4. The herein described method of recovering sulphonate sludge from still residue resultant from the treatment and distillation of light oil derived from the by-product coking of coal and containing water-insoluble sulphonates formed by acid purification and alkaline neutralization in the light oil prior to distillation, which consists in precipitating sulphonates from the still residue by agitating the still residue with low boiling aliphatic hydrocarbon, wetting the precipitate by agitating the mixture with water before the precipitated sulphonates coagulate, effecting stratification of the mixture and settling of the precipitate to form a water layer containing the sulphonates and a hydrocarbon layer containing the other still residue ingredients, separating the layer of still residue solution and the sulphonate containing water layer, and by drying recovering the sulphonates as a residual sludge.

FRANK W. CORKERY.